United States Patent [19]
Bolton

[11] 3,782,807
[45] Jan. 1, 1974

[54] LENS GIMBALING AND CARRIAGE RELEASE APPARATUS

[75] Inventor: Richard H. Bolton, Holcomb, N.Y.

[73] Assignee: Eastman Kodak Company, Rochester, N.Y.

[22] Filed: Mar. 7, 1972

[21] Appl. No.: 232,465

[52] U.S. Cl.................... 350/255, 350/252, 350/46, 350/86
[51] Int. Cl. ............................................. G02b 7/02
[58] Field of Search................ 350/86, 46, 235–257, 350/179, 180

[56] References Cited
UNITED STATES PATENTS

| | | | |
|---|---|---|---|
| 3,565,513 | 2/1971 | Akiyama | 350/255 |
| 3,704,658 | 12/1972 | Uesugi | 350/252 |
| 3,463,019 | 8/1969 | Noe | 350/252 |

*Primary Examiner*—John K. Corbin
*Assistant Examiner*—Michael J. Tokar
*Attorney*—W. H. J. Kline

[57] ABSTRACT

In image projection apparatus for projecting enlarged images from a sheet of microfilm along a projection axis, a carriage mounted for movement in at least one of mutually othogonal directions relative to the projection axis is provided with a transparent reference plate against which a projection lens assembly is spring biased. The lens assembly includes a lens barrel which is gimbally mounted and a projection lens slidably mounted in the barrel. The carriage is provided with a stop at one end which is adapted to engage the lower end of the lens barrel to prevent the carriage from being removed from the image projection apparatus when the carriage is withdrawn a predetermined distance. The apparatus is provided with a lever connected to the lens for focusing the lens by sliding it in the lens barrel. The focusing lever also engages the lens barrel and when it is moved to an extreme position causes the lens barrel to gimbal and disengage from the carriage stop thus releasing the carriage for complete withdrawal from the projection apparatus.

5 Claims, 8 Drawing Figures

PATENTED JAN 1 1974  3,782,807

LENS GIMBALING AND CARRIAGE RELEASE APPARATUS

BACKGROUND OF THE INVENTION

1. Field of the Invention

This invention relates to image projection apparatus and more particularly to image projection apparatus of the type having a microfilm carriage and a projection lens biased against a transparent member of the carriage wherein the improvement comprises lens gimbaling and carriage release apparatus.

2. Description of the Prior Art

Image projection apparatus for projecting enlarged images from a sheet of microfilm along a projection axis are well known in the art. A common type of such apparatus is the microfilm reader for viewing enlarged images of a self-contained screen from a sheet of microfilm, such as microfiche, which is positioned in a focal plane in mutually orthogonal directions relative to the projection axis of the reader. Generally, the microfiche is mounted on some form of carriage for movement in at least one of the orthogonal directions and is provided with at least an upper glass plate to maintain the fiche in a focal plane in the region of the projection axis of the reader. It has been proposed to bias the projection lens assembly against this glass plate in order to maintain constant focus as the carriage is moved relative to the lens. It is desirable that a reader having such a glass plate - "floating lens" assembly have a carriage which is selectively removable so that the plate may be cleaned or replaced if it has become unduly scratched by the interaction of the plate sliding against the bottom of the lens assembly. In such case, it is also desirable that a stop be provided to limit withdrawal of the carriage from the reader to indicate to the user of the reader that the usable portion of the microfilm has been scanned.

SUMMARY OF THE INVENTION

It is thus an object of the present invention to provide in image projection apparatus having a movable microfilm carriage, carriage release means for preventing removal of the carriage except when the carriage release means is actuated.

It is a further object of the present invention to provide in image projection apparatus having a movable microfilm carriage and a "floating lens" assembly, lens gimbaling and carriage release means wherein the floating lens assembly functions both as a projection lens and as a carriage limiting and release means.

In general, the lens gimbaling and carriage release assembly of the present invention includes a gimballed lens assembly which is spring biased against an upper transparent member of a microfilm carriage and which has a lower portion which engages stop means on the carriage to prevent withdrawal thereof from a microfilm reader. According to an aspect of the invention focusing means are provided which are movable through a predetermined range to focus the projection lens mounted by the projection lens assembly and which are also movable to an extreme position to gimbal the lens assembly out of engagement with the carriage stop means to release the carriage to allow withdrawal thereof from the reader.

The invention, and its objects and advantages, will become more apparent in the detailed description of the preferred embodiments presented below.

BRIEF DESCRIPTION OF THE DRAWINGS

The above and other objects and advantages of the present invention will become apparent to one skilled in the art from the following detailed description read in conjunction with the attached drawings wherein like reference numerals indicate like elements and wherein.

BRIEF DESCRIPTION OF THE PREFERRED EMBODIMENT

Figure 1:
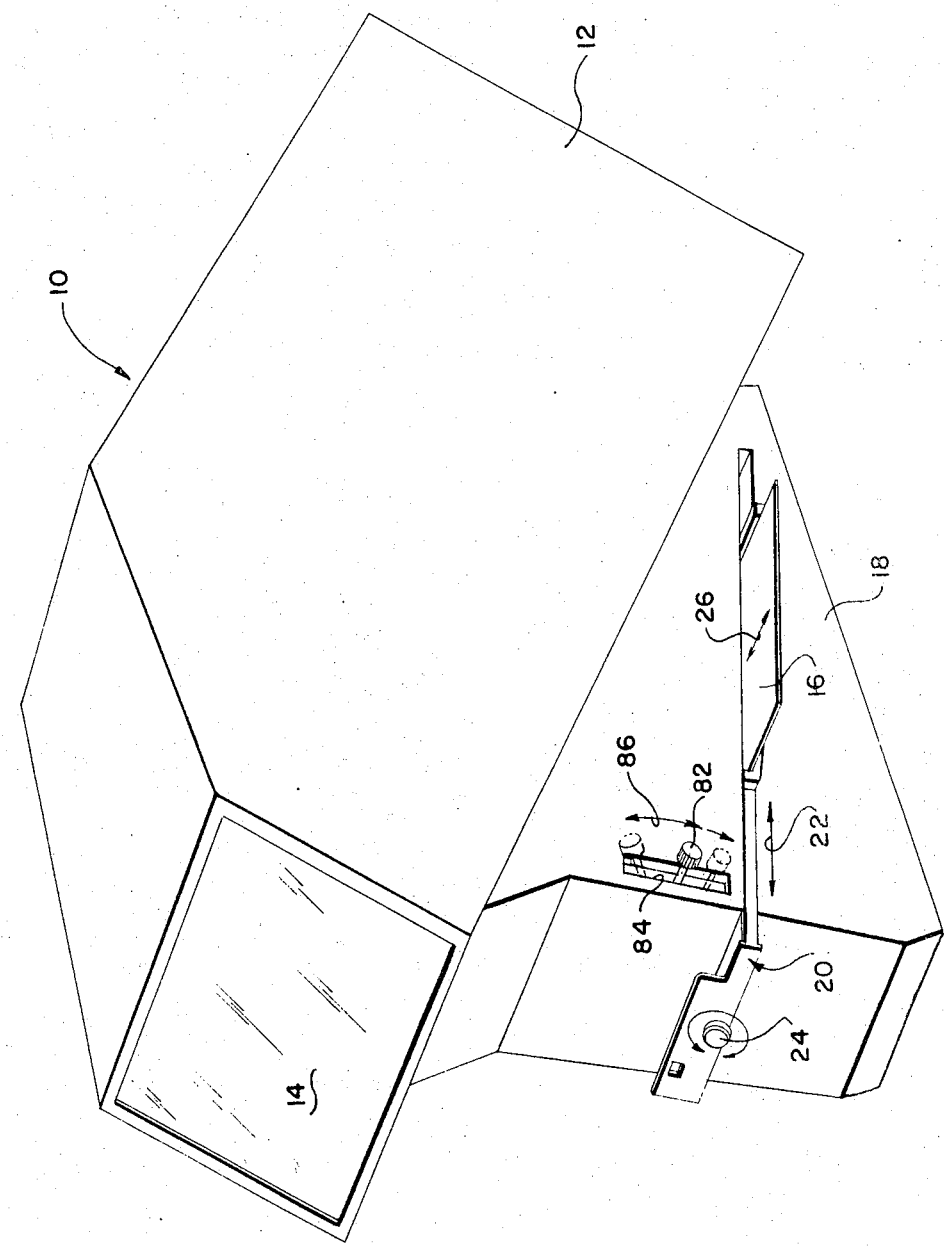
FIG. 1 is a perspective view of a microfilm reader in which the lens gimballing and carriage release apparatus of the present invention may be used.
Figure 2:
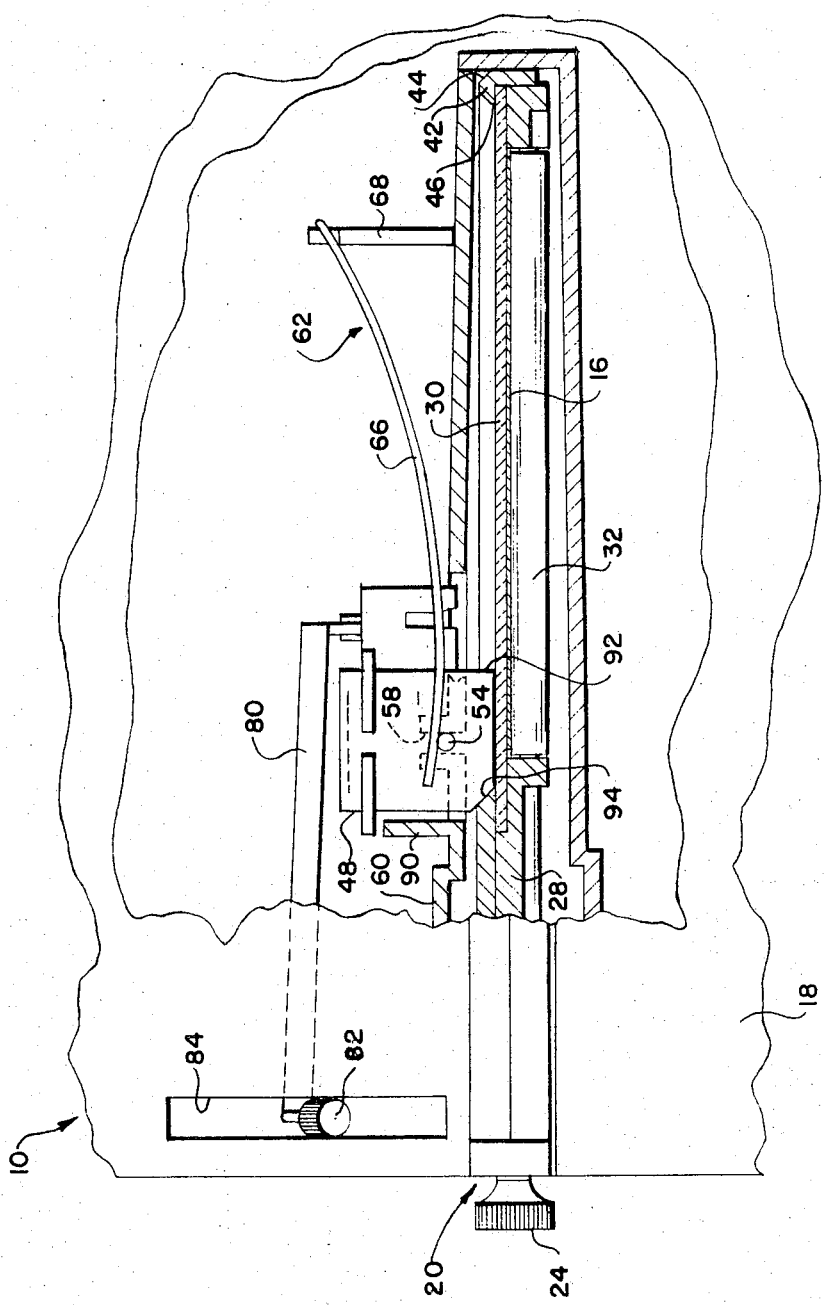
FIG. 2 is a partially sectional side elevation view of the apparatus used in the reader of FIG. 1.
Figure 3:
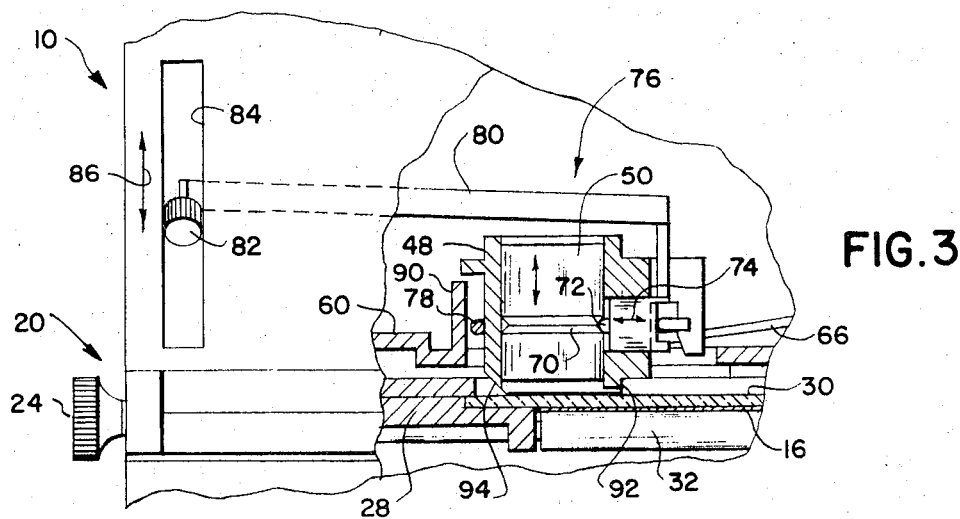
FIG. 3 is a partially sectional side elevation view of the apparatus of FIG. 2 showing in greater detail the focusing means.
Figure 4:
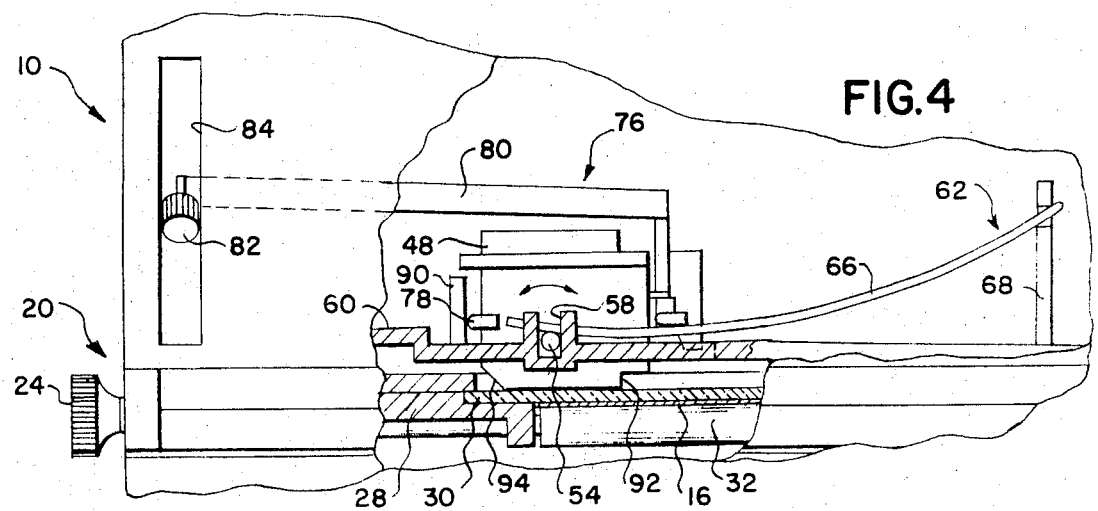
FIG. 4 is a partially sectional side elevation view of the apparatus of FIG. 2 showing in greater detail the lens gimballing means.

Referring now to the drawings there is shown a preferred embodiment of lens gimballing and carriage release apparatus according to the present invention. Generally, such apparatus is incorporated in image projection apparatus such as microfilm reader 10 shown in FIG. 1. Reader 10 includes an upper housing 12 having a viewing opening 14 through which an enlarged image projected from microfilm 16 may be viewed on a front projection screen (not shown) mounted at the rear of housing 12. Reader 10 is also provided with lower housing 18 upon which housing 12 is mounted. Housing 18 supports a carriage 20 which is mounted for movement into and out of housing 18 in the direction of arrows 22. A sheet of microfilm such as microfiche 16 is insertable into and supported by carriage 20 for movement in the direction of arrows 22. Carriage 20 is also provided with a drive mechanism actuated by rotatable control member 24 which acts upon fiche 16 to move it in the direction of arrows 26 which direction is orthogonal to the direction of arrows 22. In such manner, fiche 16 may be moved in mutually orthogonal directions relative to the projection axis of reader 20.

Referring now to FIGS. 2–8 there is shown in greater detail the lens gimballing and carriage release apparatus of the present invention. Carriage 20 includes a base member 28, a cover member 29, a transparent member 30, fiche drive means including rotatably mounted drive rollers 32 and 34 and rotatably mounted idler rollers 36 and 38 and carriage stop means 40 comprising wall 42 having beveled rear surface 44 and substantially vertical front surface 46.

A projection lens assembly includes lens barrel 48 and projection lens 50 slidably mounted in barrel 48. Barrel 48 is provided with a pair of gimballing pins 52 and 54 which respectively engage grooves 56 and 58 in member 60 of reader 10. A substantially U-shaped spring 62 has arms 64 and 66 respectively bearing against pins 52 and 54 to bias lens barrel 48 against transparent member 30 of carriage 20. Spring 62 is supported at its rear by upright member 68 on reader member 60.

Lens 50 is provided with a circumferential groove 70 into which cam pin 72 extends. Cam pin 72 forms a part of cylindrical portion 74 of focusing member 76 and is mounted eccentrically with respect to the axis of rotation of portion 74. Cylindrical portion 74 is freely journalled in lens barrel 48 and is held therein by means of wire spring 78 which partially encircles barrel 48.

Focusing member 76 also includes focusing lever 80 having an operable portion 82 projecting through slot 84 in housing 18. Focusing lever 80 is movable through a predetermined focusing range indicated by arrows 86 in FIG. 1 as lever 80 is moved through this range, lever 80 acts to rotate cylindrical portion 74 of member 76 thus causing cam pin 72 extending into groove 70 of lens 50 to move lens 50 until the projected image is brought into focus on the screen of reader 10.

Figure 5:
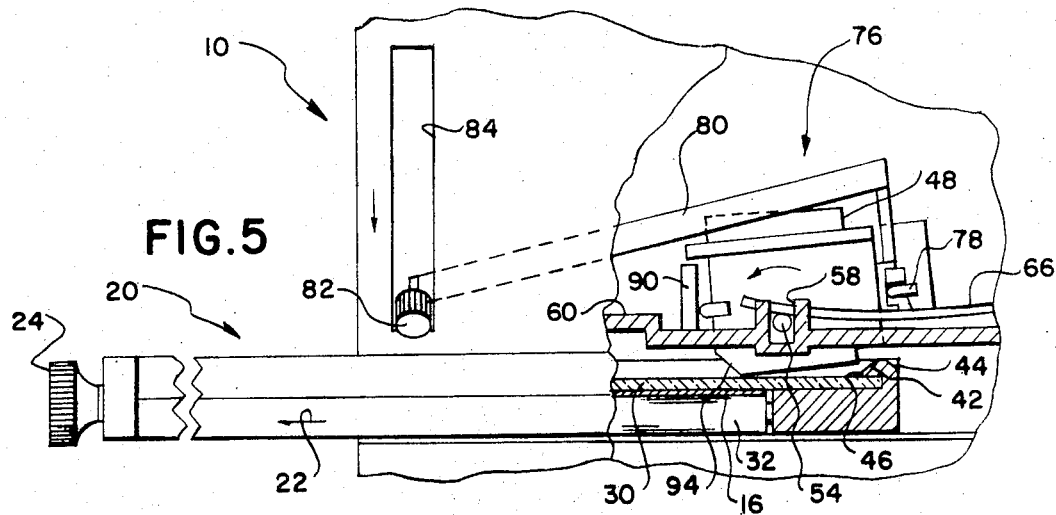
FIG. 5 is a partially sectional side elevation view of the apparatus of FIG. 2 showing the focusing lever at its extreme position wherein the lens assembly is gimballed out of engagement with the microfilm carriage.
Figure 6:
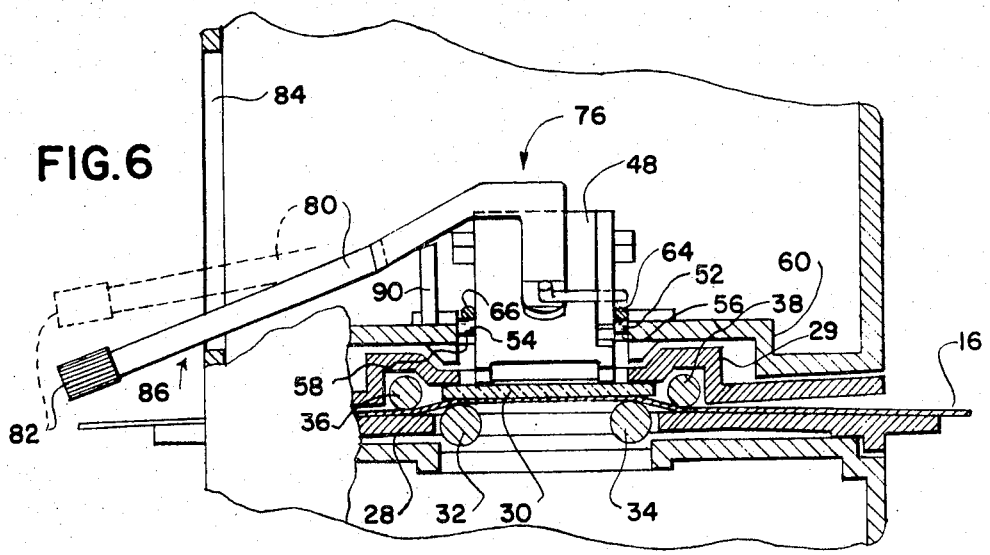
FIG. 6 is a partially sectional rear elevation view of the apparatus as shown in FIG. 5.
Figure 7:
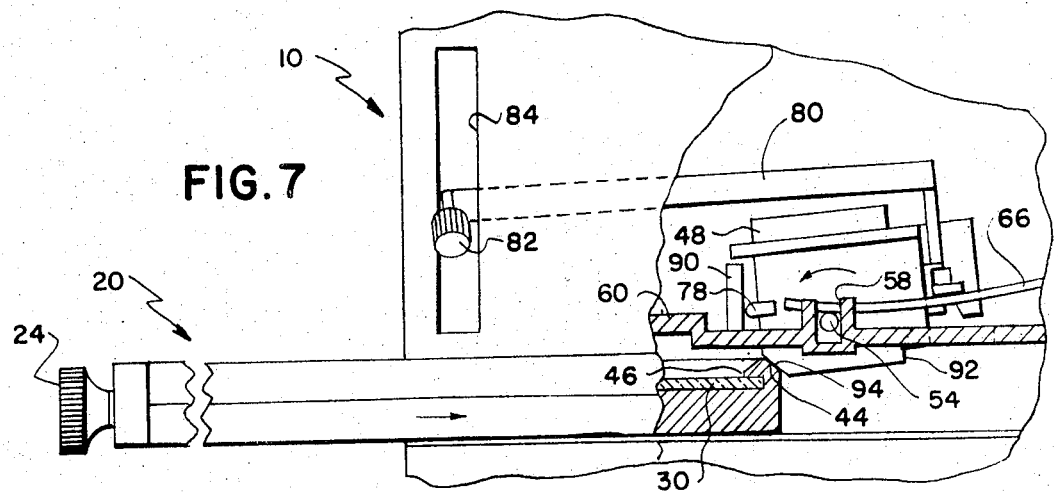
FIG. 7 is a partially sectional side elevation view as in FIG. 5 but showing the carriage withdrawn from engagement with the lens assembly.
Figure 8:
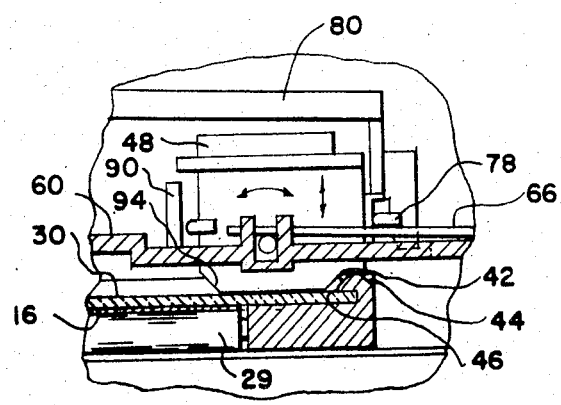
FIG. 8 is a partially sectional side elevation view as in FIG. 2 showing the lens assembly just prior to engagement with the carriage stop means.

Focusing lever 80 may also be moved to an extreme position such as position 86 in FIG. 6 to cause lever 80 to bear against the upper surface of member 90 thus causing barrel 48 to be gimballed so that its rearward surface 92 is lifted out of engagement with vertical surface 46 of stop means 40 (FIG. 5). Carriage 20 may now be withdrawn from reader 10 from cleaning and the like since barrel 48 will now ride over wall 42 (FIG. 7) without interference therefrom.

When it is desired to reinsert carriage 20 into reader 10, bevelled surface 94 of barrel 48 will engage bevelled surface 44 of wall 42 and barrel 48 will ride freely over wall 42 until it is clear thereof and comes to rest on member 30. If it is now attempted to withdraw carriage 20, surface 92 of barrel 48 will engage surface 46 of wall 42 to prevent such withdrawal.

The invention has been described in detail with particular reference to preferred embodiments thereof, but it will be understood that variations and modifications can be effected within the spirit and scope of the invention.

I claim:

1. In image projection apparatus including carriage means for supporting an image bearing medium, said carriage means having a transparent member supported above an image bearing medium supported thereby and a movably mounted projection lens assembly biased against said transparent member, the improvement comprising:

stop means mounted on said carriage means;
gimbal means for mounting said projection lens assembly for gimballing movement relative to said carriage means;
means for mounting said carriage means for movement relative to said projection assembly;
means defining a bearing surface on said projection lens assembly for bearing engagement with said stop means for preventing removal of said carriage means from said apparatus;
carriage release means connected to said projection lens assembly; and
means for mounting said carriage release means for movement between a first position wherein said defining means bears against said carriage stop means to prevent removal of said carriage means from said apparatus and a second position wherein said release means gimbals said projection lens assembly so that said bearing surface is moved out of engagement with said stop means to permit withdrawal of said carriage means from said apparatus.

2. The improvement of claim 1 wherein said projection lens assembly includes a focusable lens and wherein said carriage release means includes means connected to said lens for focusing said lens, said carriage release means being movable throughout a range including said first position at one end thereof to focus said lens.

3. The improvement of claim 1 wherein said projection lens assembly comprises a lens barrel and a lens slidably mounted in said lens barrel and wherein said carriage release means includes a focusing member linked to said lens and means for mounting said focusing member for movement (a) through a range for focusing said lens and (b) between a first position at one end of said range of movement wherein said bearing surface engages said stop means to prevent withdrawal of said carriage means from said apparatus and a second position wherein said lens barrel is gimballed such that said bearing surface is disengaged from said stop means to permit withdrawal of said carriage means from said apparatus.

4. The improvement of claim 3 wherein said stop means comprises a wall adjacent the end of said carriage means said wall having a bearing surface adapted to engage said bearing surface of said lens assembly.

5. The improvement of claim 1 wherein said gimbal means includes a pair of oppositely disposed pins projecting therefrom and further includes means defining a pair of grooves on said apparatus into which said pins project.

* * * * *